United States Patent
Campbell et al.

[11] Patent Number: 5,973,806
[45] Date of Patent: Oct. 26, 1999

[54] SYSTEM AND METHOD FOR STEERING FRESNEL REGION DATA USING CYLINDRICAL COORDINATES TO ACCESS DATA LOCATIONS IN A HOLOGRAPHIC MEMORY

[75] Inventors: Scott Patrick Campbell, Chatham; Kevin Richard Curtis, Summit; Michael C. Tackitt, Califon, all of N.J.

[73] Assignee: Lucent Technologies, Inc., Murray Hill, N.J.

[21] Appl. No.: 09/206,873
[22] Filed: Dec. 8, 1998

Related U.S. Application Data

[63] Continuation of application No. 08/881,404, Jun. 24, 1997, abandoned.
[51] Int. Cl.$^6$ .............................. G02B 5/32; G03H 1/26
[52] U.S. Cl. ................................................. 359/15; 359/22
[58] Field of Search ................................ 359/1, 15, 22

[56] References Cited

U.S. PATENT DOCUMENTS 4,550,395  10/1985  Carlson ........................................ 369/94
5,481,523   1/1996  DeWald ....................................... 369/103

*Primary Examiner*—Thong Nguyen
*Assistant Examiner*—Jared Treas

[57] ABSTRACT

Systems and methods for steering an optical path to gain access to data locations in a holographic memory cell (HMC). One of the systems includes: (1) first and second reflective elements locatable to receive and reflect a complex, spatially-modulated incident beam of light, (2) a reflective element steering mechanism, coupled to the first and second reflective elements, that moves the first and second reflective elements to steer the incident beam in a desired direction and (3) an HMC rotating mechanism, couplable to the HMC, that rotates the HMC about an axis thereof, the reflective element steering mechanism and the HMC rotating mechanism cooperating to cause the incident beam to illuminate a location on a plane of the HMC that is a function of a movement of the first and second reflective elements and a rotational position of the HMC.

17 Claims, 8 Drawing Sheets

5,973,806

SYSTEM AND METHOD FOR STEERING FRESNEL REGION DATA USING CYLINDRICAL COORDINATES TO ACCESS DATA LOCATIONS IN A HOLOGRAPHIC MEMORY

This application is a continuation of the U.S. application Ser. No. 08/881,404, filed on Jun. 24, 1997, now abandoned.

TECHNICAL FIELD OF THE INVENTION

The present invention is directed, in general, to holographic memory cells (HMCs) and, more specifically, to an optical system for accessing data locations in a holographic memory.

CROSS-REFERENCE TO RELATED APPLICATIONS

The present invention is related to that disclosed in:
1. U.S. patent application Ser. No. 08/891,579, entitled "System and Method Using Linear Translation to Access Data Locations in a Holographic Memory" and filed concurrently herewith;
2. U.S. patent application Ser. No. 08/881,540, entitled "System and Method For Steering Focal Plane Data to Access Data Locations in a Holographic Memory" and filed concurrently herewith;
3. U.S. patent application Ser. No. 08/881,736, entitled "System and Method for Steering Fresnel Region Data to Access Data Locations in a Holographic Memory" and filed concurrently herewith;
4. U.S. patent application Ser. No. 08/881,866, entitled "System and Method for Precessing an Optical Path Using Cylindrical Coordinates to Access Data Locations in a Holographic Memory" and filed concurrently herewith; and
5. U.S. patent application Ser. No. 08/881,572, entitled "System and Method for Steering Focal Plane Data Using Cylindrical Coordinates to Access Data Locations in a Holographic Memory" and filed concurrently herewith.

Each reference is commonly assigned with the present invention.

BACKGROUND OF THE INVENTION

Most modern processing systems, including personal computers (PCs), rely on one form or another of optical data storage. For example, CD-ROM drives are now standard equipment on nearly all new PCs. Nearly all multimedia software, including video games, maps, encyclopedias, and the like, are sold on CD-ROM. Also, compact discs are the most prevalent storage medium for musical recording. More recently, digital video disc (DVD) technology has been introduced that will expand the storage capacity of standard CD technology from about one-half gigabyte to about five gigabytes.

The large storage capacities and relatively low costs of CD-ROMs and DVDs have created an even greater demand for still larger and cheaper optical storage media. Many large businesses rely on jukebox-style CD changers in order to access a particular one of potentially hundreds of discs. Motion pictures released in optical storage format still require multiple CDS or oversized laser discs. However, it appears that the limits of CD-ROM and DVD technology are being reached. In order to continue to improve the capacity and speed of optical storage systems, research increasingly focuses on holographic storage devices capable of storing hundreds of gigabytes in a CD-sized storage medium.

A number of holographic data storage systems have been developed that are capable of storing and retrieving an entire page of data at a time. In these systems, data to be stored is first encoded in a two dimensional (2D) optical array, for example on a liquid crystal display (LCD) screen, which is one type of spatial light modulator (SLM). Another type of SLM is Texas Instruments' Digital Mirror Device, which is a reflective device that allows the reflectivity of each pixel to be changed. The term "SLM" also includes fixed masks of varying optical density, phase, or reflectivity.

A first laser beam, called an object beam, is transmitted through the SLM and picks up an intensity pattern from the data squares and rectangles (pixels) in the 2D array. The data-encoded object beam is ultimately projected onto and into a light-sensitive material, called a holographic memory cell (HMC). A second laser beam, called a reference beam, is also projected onto and into the holographic memory cell. The object beam and the reference beam then cross to produce an interference pattern throughout a volume element of the HMC. This unique interference pattern induces material alterations in the HMC that generate a hologram.

The formation of the hologram in the holographic memory cell is a function of the relative amplitudes of, and the phase differences between, the object beam and the reference beam. It is also highly dependent on the incident angles at which the object beam and the reference beam were projected onto the holographic memory cell. After hologram storage, the data beam may be reconstructed by projecting into the HMC a reference beam that is the same as the reference beam that produced the hologram. The hologram and the reference beam then interact to reproduce the data-encoded object beam, which may then be projected onto a two-dimensional array of light sensitive detectors which read back the data by sensing the pattern of light and dark pixels.

The object beam produced by the spatial light modulator has a high space-bandwidth product (SBP). The SBP of a beam is equal to the number of pixels the beam contains. For example, the 800×600 pixel image produced by a SVGA computer monitor has a SBP of 480,000. When high SBP beams are projected into a holographic memory cell, it is important to keep the optical path lengths traversed by the beams constant. Otherwise, the high SBP image will go out of focus and the data will be lost.

Maintaining a constant optical path length in order to keep the high SBP image of the object beam in focus necessarily makes it difficult to steer the object beam to different areas on the surface of the holographic memory cell, because such steering frequently causes the optical path length to change. For this reason, many holographic data storage systems project a reference beam through an acousto-optic cell, which diffracts the reference beam through an optical system, such as a 4-f imaging system, that has a fixed optical path length. Altering the frequency of the acoustic wave changes the angle at which the reference beam is diffracted and therefore incident to the surface of the holographic memory cell. Systems using such angle-tuned reference beam steering are known as "angle multiplexing" systems and are distinguished by their capability to project different pages of data into the same location on the surface of the holographic memory cell, but at different angles of reference-beam incidence. The data is then retrieved by steering the interrogating reference beam at different angles of incidence. However, these prior art systems are inadequate to steer a high SBP object beam to different areas of the holographic memory cell because of their inherent limitations with respect to space-bandwidth product throughput.

Accordingly, there is a need in the art for improved optical systems that are capable of steering high space-bandwidth product images to different regions on the surface of a holographic memory cell without causing the image to lose focus. There is a further need in the art for improved optical systems capable of steering high space-bandwidth product images in more than one dimension in a coordinate system. There is a still further need in the art for improved optical systems capable of steering complex reference beams in more than one dimension in a coordinate system.

SUMMARY OF THE INVENTION

To address the above-discussed deficiencies of the prior art, the present invention provides systems and methods for steering a complex, spatially-modulated incident beam of light to gain access to data locations in an HMC. One of the systems includes: (1) first and second reflective elements locatable to receive and reflect said incident beam, (2) a reflective element steering mechanism, coupled to the first and second reflective elements, that moves the first and second reflective elements to steer the incident beam in a desired direction and (3) an HMC rotating mechanism, couplable to the HMC, that rotates the HMC about an axis thereof, the reflective element steering mechanism and the HMC rotating mechanism cooperating to cause the incident beam to illuminate a location on a plane of the HMC that is a function of a movement of the first and second reflective elements and a rotational position of the HMC.

The present invention therefore introduces the broad concept of moving a duality of reflective elements, such as mirrors, and rotating an HMC to read or write to different locations on the HMC.

In one embodiment of the present invention, the reflective element steering mechanism rotates the first and second reflective elements about first and second axes, respectively. In an alternative embodiment, the reflective element steering mechanism translates the first and second reflective elements in tandem.

In one embodiment of the present invention, the incident beam passes through an aperture in the HMC. In an alternative embodiment, the incident beam passes about a periphery of the HMC.

In one embodiment of the present invention, the HMC is substantially planar. However, the present invention is employable with nonplanar HMCs, should they be advantageous in a given application.

The foregoing has outlined, rather broadly, various embodiments of the present invention so that those skilled in the art may better understand the detailed description of the invention that follows. More specific embodiments of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
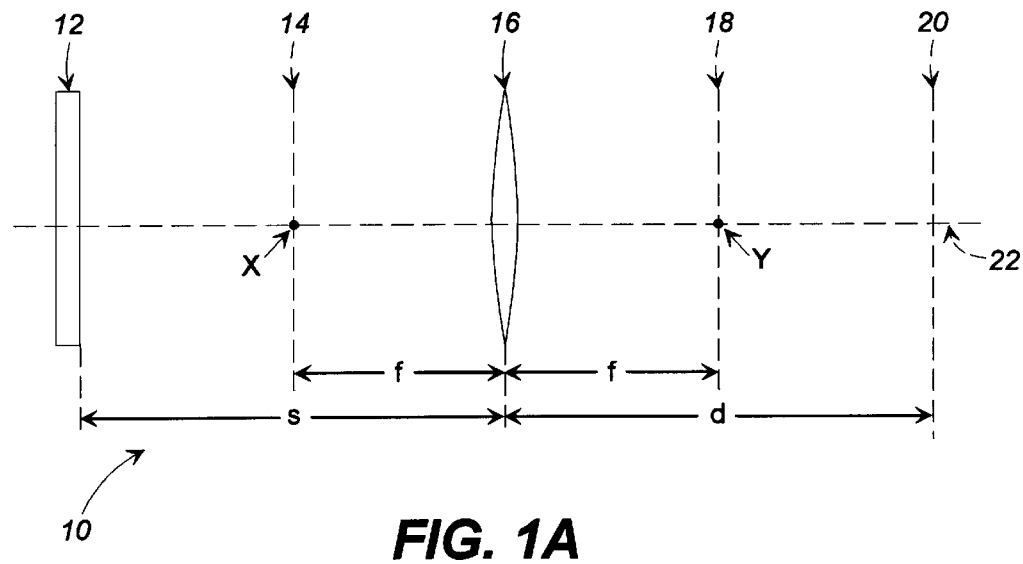
FIG. 1A illustrates a conventional single lens imaging system.

FIG. 1A illustrates a conventional single lens imaging system 10. Although single lens systems are well known, single lens system 10 is described here in detail so that the descriptions of the present invention which follow may be more clearly understood. Single lens system 10 comprises spatial light modulator (SLM) 12 and thin convex lens 16. Lens 16 has two focal points. Focal point X lies in plane 14, shown as a dotted line, one focal length, f, away from lens 16. On the opposite side of lens 16, focal point Y lies in plane 18, shown as a dotted line, one focal length, f, away from lens 16. SLM 12 comprises, for example, a liquid crystal display (LCD) screen on which data is encoded in a two-dimensional (2D) pattern of transparent and opaque pixels. SLM 12 and lens 16 are positioned orthogonally to optical path 22, shown as a dotted line. If a thin lens having a focal length, f, is positioned at a distance, s, from an input object, the lens will form an output image at a distance, d, on the opposite side of the lens, according to the thin lens equation: $1/f = (1/s + 1/d)$. In the configuration shown in FIG. 1A, SLM 12 is positioned at a distance, s, from lens 16, so that the output image of SLM 12 is formed at plane 20, shown as a dotted line, at a distance, d, away from lens 16.

In selected embodiments of the present invention described below, s, d, and f are selected so that s=d=2f, and the total separation, s+d, between SLM 12 and its output image is therefore 4f. However, these embodiments should not be confused with a 4-f system using two lenses in infinite conjugate.

Figure 1B:
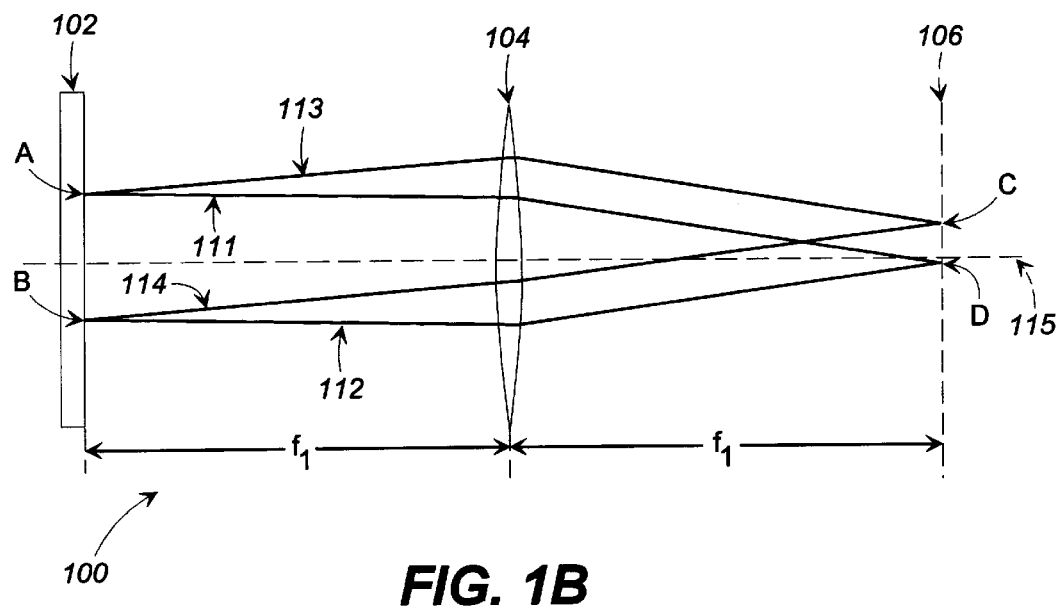
FIG. 1B illustrates a conventional single lens Fourier transforming system.

FIG. 1B illustrates a conventional single lens Fourier transforming system 100. Although Fourier transforms of input objects are well known, Fourier transform system 100 is described here in detail so that the descriptions of the present invention which follow may be more clearly understood. An object beam of coherent laser light is projected through SLM 102 and picks up the encoded data pattern and propagates distance $f_1$ to reach lens 104. The object beam passes through lens 104 and propagates distance $f_1$ again to reach Fourier plane 106. At the Fourier plane, all of the object beam's positional information becomes angular information and all of the object beam's angular information becomes positional information.

This phenomenon may be understood by reference to light beams 111 and 113, which emanate from point A on SLM 102, and to light beams 112 and 114, which emanate from point B on SLM 102. The small pixels in the 2D-array pattern on SLM 102 form small apertures that cause diffraction of the object beam as it passes through SLM 102. Thus, light emanates outward from points A and B over a broad range of directions. Light beams 111 and 112 are parallel to one another and propagate perpendicularly outward from SLM 102. Light beams 113 and 114 are also parallel to one another but propagate outward at an oblique angle from SLM 102. Since light beams 111 and 112 are parallel, their angles of incidence at lens 104 are the same. Similarly, since light beams 111 and 112 are parallel, their angles of incidence at lens 104 are the same.

As is well known, it is a property of a thin lens, such as lens 104, that parallel light beams that pass through the lens are focused (converged) by the lens to the same point at the Fourier plane. Thus, parallel beams 111 and 112 converge at point D in Fourier plane 106, even though beams 111 and 112 emanate from different points at SLM 102. Similarly, parallel beams 113 and 114 converge at point C in Fourier plane 106, even though beams 113 and 114 emanate from different points at SLM 102.

It is also a property of a thin lens, such as lens 104, that light beams emanating at different angles (i.e., nonparallel) from the same point at the input object (SLM 102) become parallel light beams after passing through the thin lens. Thus, light beams 111 and 113, which emanate at different angles (i.e., nonparallel) from point A at SLM 102, become parallel to each other after passing through lens 104 and therefore have the same angles of incidence at points C and D in Fourier plane 106. Likewise, light beams 112 and 114, which emanate at different angles (i.e., nonparallel) from point B at SLM 102, become parallel to each other after passing through lens 104 and therefore have the same angles of incidence at points C and D in Fourier plane 106.

From the foregoing, it can be seen that the position at which a beam of light is incident on Fourier plane 106 is determined by the angle (not the position) at which it left SLM 102. Similarly, it can be seen that the angle at which a beam of light is incident on Fourier plane 106 is determined by the position (not the angle) at which it left SLM 102. Therefore, as was stated above, at the Fourier plane, all of the object beam's positional information becomes angular information and all of the object beam's angular information becomes positional information.

Figure 2:
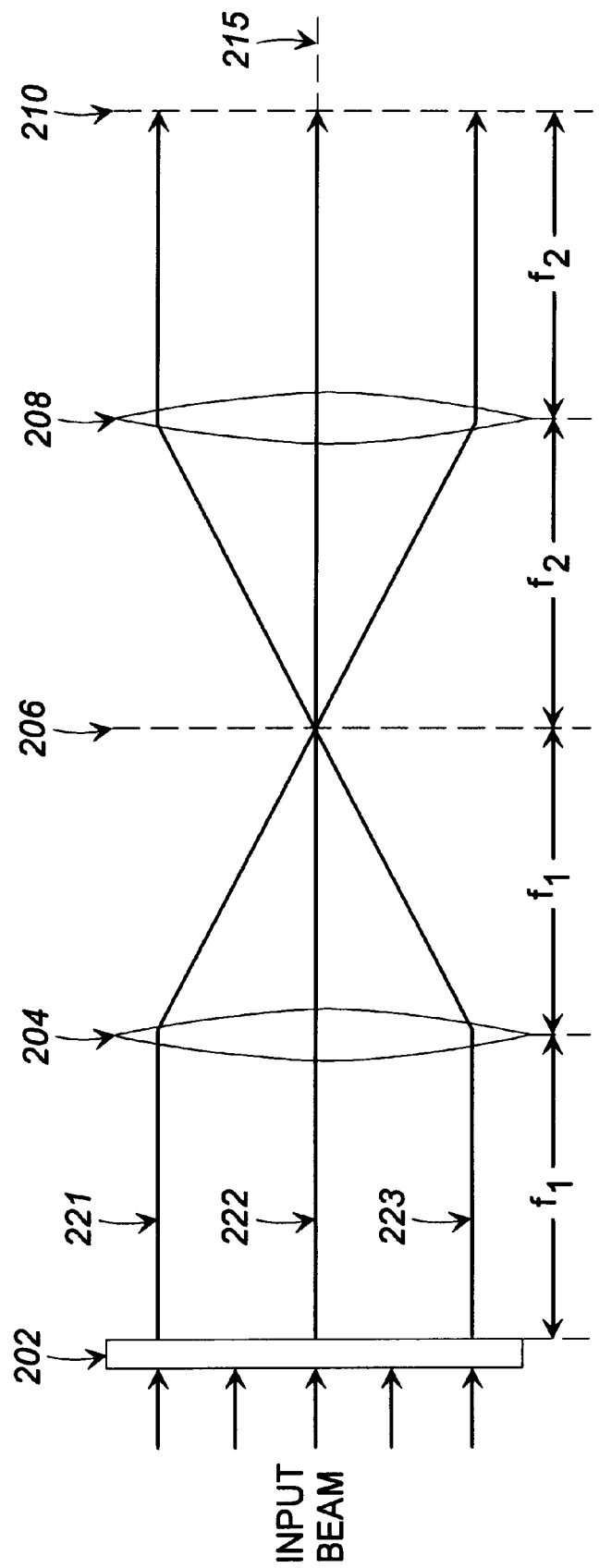
FIG. 2 illustrates a conventional 4-f (four-f) imaging system.

FIG. 2 illustrates a conventional 4-f (four f) imaging system 200. The configuration of 4-f imaging system 200 shown in FIG. 2 is referred to as "infinite conjugate." Although 4-f imaging systems are well known, 4-f imaging system 200 is described here in detail so that the descriptions of the present invention which follow may be more clearly understood. 4-f imaging system 200 comprises spatial light modulator (SLM) 202, thin convex lens 204, which has a focal length, $f_1$, and thin convex lens 208, which has a focal length, $f_2$, where $f_1$ and $f_2$ may or may not be equal. SLM 202 comprises, for example, a liquid crystal display (LCD) screen on which data is encoded in a 2D-array pattern of transparent and opaque pixels. SLM 202, lens 204 and lens 208 are positioned orthogonally to optical path 215, shown as a dotted line.

An object beam of coherent laser light is projected through SLM 202, picks up the encoded data pattern, and propagates distance $f_1$ to reach lens 204. The object beam, represented by light beams 221–223, passes through lens 204 and propagates distance $f_1$ again to reach Fourier plane 206. As explained above with respect to FIG. 1B, at Fourier plane 206, all of the object beam's positional information becomes angular information and all of the object beam's angular information becomes positional information.

The image formed at Fourier plane 206 is the input object for lens 208. From Fourier plane 206, the object beam propagates distance $f_2$ to reach lens 208. After passing through lens 208, the object beam finally propagates distance $f_2$ to reach output image plane 210, where the input data image at SLM 202 is reconstructed. Output image plane 210 is the Fourier plane for plane 206, as well as the output image plane for the plane in which SLM 202 lies. Thus, the image formed at output image plane 210 by lens 208 is the Fourier image of the Fourier image formed at Fourier plane 206 by lens 204.

As light beams 221–223 show, the input data image formed at output image plane 210 is inverted with respect to its appearance at SLM 202. Therefore, if a holographic memory cell was positioned at output image plane 210, the inverted image of the 2D-array pattern at SLM 202 would be stored as a page of data in the holographic memory cell. A separate reference beam of laser light (not shown) would be required in order to store the data image.

In alternate embodiments of the above-described optical systems, the spatial light modulator may be positioned between the initial lens and the following Fourier plane. An object beam that is incident to the initial lens will be converged by the initial lens, but will pick up the encoded data from the SLM after, rather than before, the initial lens. In such a configuration, the size (positions) of the Fourier orders vary linearly with the distance between the SLM and the following Fourier plane. Additionally, the incident angles of the beams will vary according to the position of the SLM.

The beam steering systems disclosed in the co-pending applications filed concurrently with the present disclosure translate or angularly rotate focal planes containing image data or Fourier transform data at the surface of holographic memory cells. These systems generally comprise one or more mirrors and at least one refractive element, such as a convex lens. If, however, lensless steering is desired, then Fresnel region steering can be used. The Fresnel region is the region between a lens and the following Fourier focal plane or image focal plane. In Fresnel region steering, two movable mirrors are placed between one of the lenses in an optical system and the corresponding following Fourier or image focal plane. Advantageously, no additional optics (i.e., lenses) are needed after the pair of moving mirrors in order to complete the steering process.

Figure 3:
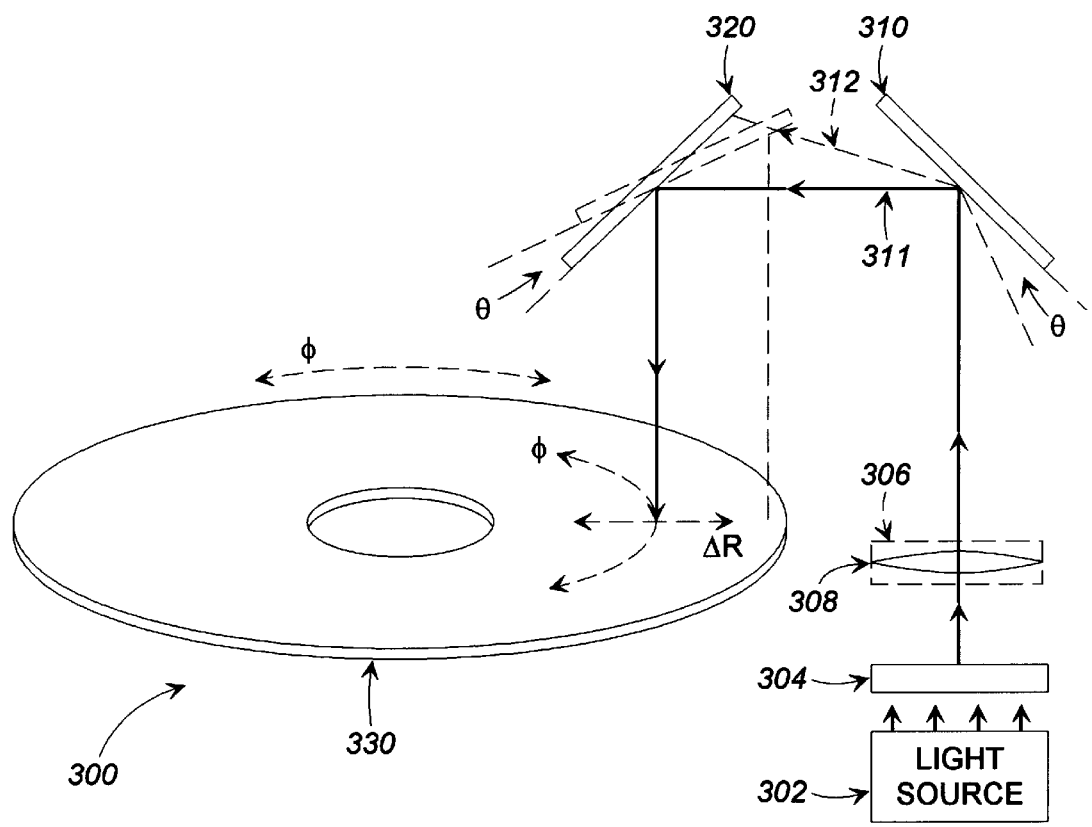
FIG. 3 illustrates a Fresnel region beam steering system according to a first embodiment of the present invention.

FIG. 3 illustrates Fresnel region beam steering system 300 according to a first embodiment of the present invention. Beam steering system 300 comprises light source 302, spatial light modulator 304, imaging system 306, rotating mirrors 310 and 320 and holographic memory cell (HMC) 330. Beam steering system 300 also includes rotation control devices (not shown in FIG. 3, but including, for example, orbital control 540 of FIG. 5) for rotating mirrors 310 and 320. Light source 302 emits a planar wave object beam, such as a beam of coherent laser light, towards spatial light modulator (SLM) 304. SLM 304 comprises, for example, a liquid crystal display (LCD) screen on which data is encoded in a two-dimensional (2D) pattern of transparent and opaque pixels. The data-encoded object beam then passes through imaging system 306, such as the single lens imaging system in FIG. 1A, or the 4-f imaging system in FIG. 2.

Lens 308 is representative of the last lens in imaging system 306 through which the object beam passes and therefore may be the equivalent of lens 16 in FIG. 1A or the equivalent of lens 208 in FIG. 2. The object beam, shown as a solid line and as a dotted line, is reflected by mirror 310 towards mirror 320, which reflects the object beam onto HMC 330.

Mirror 310 and mirror 320 are rotationally mounted on drive arms such that the distance between the centers of the surfaces of mirrors 310 and 320 is fixed and such that the angle formed by the planes in which the surfaces of mirrors 310 and 320 lie remains constant as mirrors 310 and 320 are rotated. Therefore, the relative separation between mirror 310 and mirror 320 is fixed and the relative angle formed by the surfaces of mirror 310 and mirror 320 is also fixed.

The object beam is imaged onto HMC 330 after reflecting off mirror 310 and mirror 320. HMC 330 may be oriented orthogonally to the object beam reflected from mirror 320 if an image or Fourier transform is to be clearly focused at HMC 330. The image that is incident on the surface of HMC 330 may be, for example, the image or Fourier transform of the incoming object beam, or may be some intermediate plane in the Fresnel region.

Rotational controls (such as orbital control 540 of FIG. 5) cause drive arms to rotate mirror 310 and mirror 320 the same amount in order to keep the relative angle formed by the surfaces of the mirrors constant. A representative object beam, shown as solid line 311, is reflected from mirrors 310 and 320 (in their original unrotated positions) onto HMC 330. When mirrors 310 and 320 are rotated, the representative object beam is reflected along a different optical path, shown as dotted line 312, and is steered a distance $\Delta R$, across the surface of HMC 330. The representative object beam remains at a constant angle of incidence to HMC 330 as it is steered.

The critical aspect is that the optical path length of the representative object beam remains constant as mirrors 310 and 320 are rotated. Rotating mirrors 310 and 320 by an angular amount $\theta$ results in translation of the object beam by an amount $\Delta R$ at HMC 330. The amount of translation $\Delta R$ depends on the relative orientations of mirrors 310 and 320 as well as their absolute orientations.

Steering is achieved in a second axis of the cylindrical coordinate system $(R,\phi)$ according to the orbital angle, $\phi$, of HMC 330. HMC 330 can be orbited through a full 360° rotation by an orbital control (not shown in FIG. 3, but shown in FIG. 5 as orbital control 540).

Figure 4:
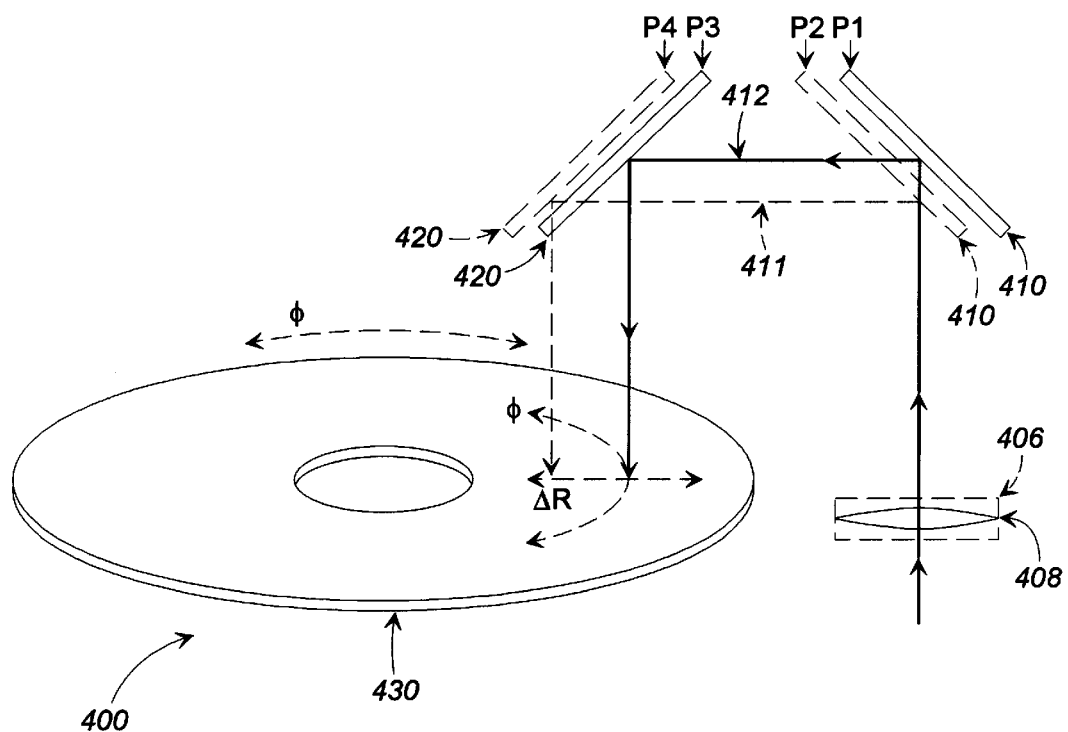
FIG. 4 illustrates a Fresnel region beam steering system according to a second embodiment of the present invention.

FIG. 4 illustrates Fresnel region beam steering system 400 according to a second embodiment of the present invention. Beam steering system 400 uses translating mirrors, rather than rotating mirrors to steer the object beam. Like beam steering system 300, beam steering system 400 comprises a light source and a spatial light modulator. For simplicity, these devices are not shown in FIG. 4, but are illustrated in previous FIGS. Beam steering system 400 also comprises imaging system 406, translating mirrors 410 and 420 and holographic memory cell (HMC) 430. Beam steering system 400 also includes translation controls (not shown in FIG. 4, but including, for instance, translation control 655 of FIG. 6) for translating mirrors 410 and 420.

The light source (not shown in FIG. 4, but illustrated in previous FIGURES) emits a planar wave object beam that passes through the spatial light modulator (not shown). The data-encoded object beam then passes through imaging system 406, such as the single lens imaging system in FIG. 1A, or the 4-f imaging system in FIG. 2. Lens 408 is representative of the last lens in imaging system 406 through which the object beam passes and therefore may be the equivalent of lens 16 in FIG. 1A or the equivalent of lens 208 in FIG. 2. The object beam, shown as a solid line and as a dotted line, is reflected by mirror 410 towards mirror 420, which reflects the object beam onto HMC 430.

Mirror 410 and mirror 420 are rigidly mounted on a drive arm in fixed positions. Therefore, the relative separation between mirror 410 and mirror 420 is fixed and the relative angle formed by the surfaces of mirror 410 and mirror 420 is also fixed, even as mirror 410 and mirror 420 are translated. The object beam is imaged onto HMC 430 after reflecting off mirror 410 and mirror 420. HMC 430 and mirror 420 are relatively positioned with respect to one another such that the surface of HMC 430 is oriented at a constant angle of incidence to the object beam reflected from mirror 420. The image that is incident on the surface of HMC 430 may be, for example, the image or Fourier transform of the incoming object beam, or may be some intermediate plane in the Fresnel region.

The original positions of mirror 410 and mirror 420 are shown as solid lines. The translated positions of mirror 410 and mirror 420 are shown as dotted lines. Translation causes mirror 410 to move from position P1 to position P2 and causes mirror 420 to move from position P3 to position P4 in tandem with mirror 410.

A representative object beam, shown as solid line 412, is reflected from mirrors 410 and 420 (in their original positions) onto HMC 430. When mirrors 410 and 420 are translated, the representative object beam is reflected along a different optical path, shown as dotted line 411, and is steered a distance ΔR, across the surface of HMC 430. The representative object beam remains at a constant angle of incidence to HMC 430 as it is steered.

Translation by an amount Δl of mirrors 410 and 420 results in translation of the representative object beam by an amount ΔR at the surface of HMC 430. The amount of the translation ΔR depends on the relative orientations of mirrors 410 and 420 as well as their absolute positions.

Steering is achieved in a second axis of the polar coordinate system (R,φ) according to the orbital angle, φ of HMC 430. HMC 430 can be orbited through a full 360° rotation by an orbital control (again, such as orbital control 540 of FIG. 5).

Figure 5:
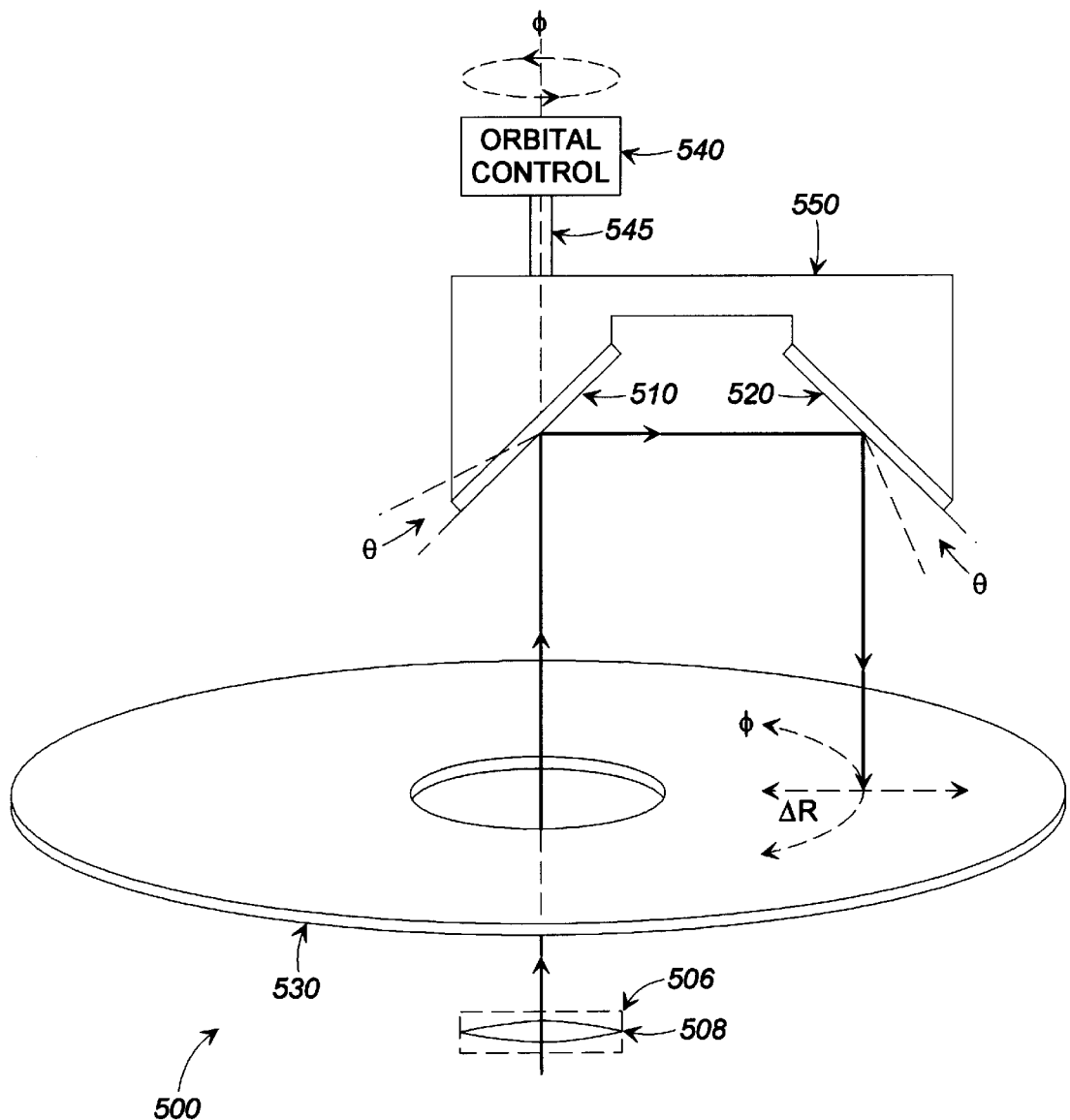
FIG. 5 illustrates a Fresnel region beam steering system according to a third embodiment of the present invention.

FIG. 5 illustrates Fresnel region beam steering system 500 according to a third embodiment of the present invention. Beam steering system 500 comprises a light source (again, not shown), a spatial light modulator (again, not shown), imaging system 506, and an orbiting optical system comprising rotatable mirrors 510 and 520, and orbiting arm 550. Beam steering system 500 also comprises holographic memory cell (HMC) 530, mirror-rotating orbital control 540 and drive shaft 545.

A light source (again, not shown) emits a planar wave object beam, such as a beam of coherent laser light, towards a spatial light modulator (again, not shown). The spatial light modulator (SLM) comprises, for example, a liquid crystal display (LCD) screen on which data is encoded in a two-dimensional (2D) pattern of transparent and opaque pixels. The data-encoded object beam is transmitted through imaging system 508, such as the single lens imaging system in FIG. 1A, or the 4-f imaging system in FIG. 2 and eventually passes through a hole in the center of HMC 530

Lens 508 is representative of the last lens in imaging system 506 through which the object beam passes and therefore may be the equivalent of lens 16 in FIG. 1A or the equivalent of lens 208 in FIG. 2.

Rotatable mirror 510 and rotatable mirror 520 are rotationally mounted on orbiting arm 550 such that the distance between the centers of the surfaces of mirrors 510 and 520 is fixed and such that the angle formed by the planes in which the surfaces of mirrors 510 and 520 lie remains constant as mirrors 510 and 520 are rotated. Therefore, the relative separation between mirror 510 and mirror 520 is fixed and the relative angle formed by the surfaces of mirror 510 and mirror 520 is also fixed.

The object beam is imaged onto HMC 530 after reflecting off mirror 510 and mirror 520. HMC 530 may be oriented orthogonally to the object beam reflected from mirror 520 if an image or Fourier transform is to be clearly focused at HMC 530. The image that is incident on the surface of HMC 530 may be, for example, the image or Fourier transform of the incoming object beam, or may be some intermediate plane in the Fresnel region.

Rotational controls (associated with orbital control 540) cause drive arms to rotate mirror 510 and mirror 520 the same amount in order to keep the relative angle formed by the surfaces of the mirrors constant. When mirrors 510 and 520 are rotated, the object beam is steered a distance ΔR, across the surface of HMC 530. The object beam remains at a constant angle of incidence to HMC 530 as it is steered. Rotating mirrors 510 and 520 by an angular amount θ results in translation of the object beam by an amount ΔR at HMC 530. The amount of translation ΔR depends on the relative orientations of mirrors 510 and 520 as well as their absolute orientations.

Steering is achieved in a second axis of the polar coordinate system (R,φ) by orbiting arm 550. Orbiting arm 550 can be turned through a full 360° orbit by orbital control 540 and drive shaft 545. As orbiting arm 550 is turned about the orbital axis, shown as a dotted line, through drive shaft 545, mirror 510 rotates in place at the orbital axis and mirror 520 orbits about mirror 510 and the orbital axis. The position of orbital arm 550 therefore determines the orbital angle, φ, of the object beam in the polar coordinate system (R,φ).

Figure 6:
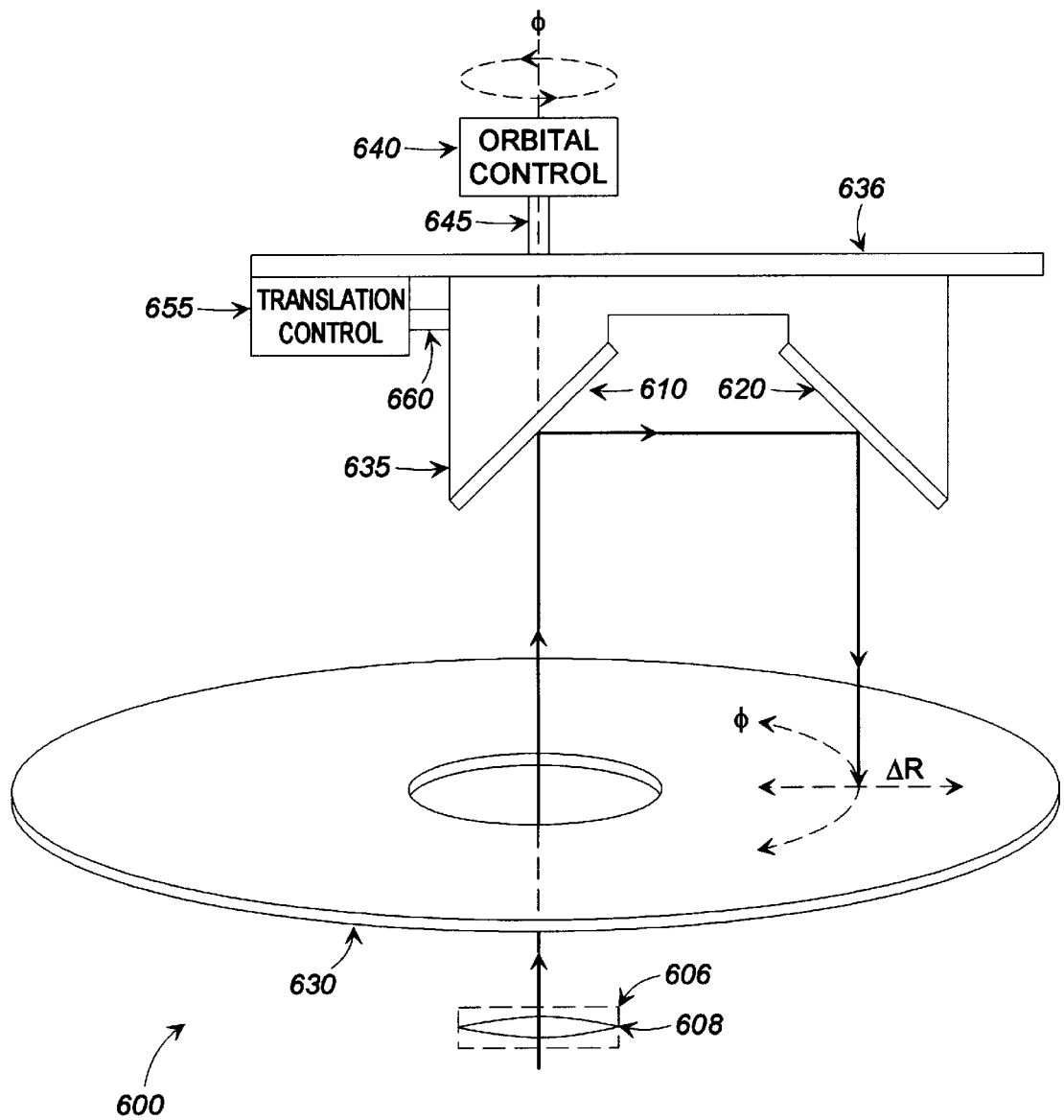
FIG. 6 illustrates a compound Fresnel region beam steering system according to a fourth embodiment of the present invention.

FIG. 6 illustrates compound Fresnel region beam steering 600 system according to a fourth embodiment of the present invention. Beam steering system 600 uses translating mirrors, rather than rotating mirrors to steer the object beam. Like beam steering system 500, beam steering system 600 comprises a light source and a spatial light modulator. For simplicity, these devices are not shown in FIG. 6, but are illustrated in previous FIGS. Beam steering system 600 also comprises imaging system 606, translating mirrors 610 and 620 and holographic memory cell (HMC) 630. Beam steering system 600 also includes translation control 655 and drive arm 660 for translating mirrors 610 and 620.

Mirrors 610 and 620 are rigidly mounted on sliding assembly 635. Sliding assembly 635 is slidably mounted on orbiting arm 636. Translation control 655 and drive shaft 660 are rigidly attached to orbiting arm 636, and drive arm 660 is connected to sliding assembly 635. Translation control 655 extends or retracts drive arm 660 in order to translate sliding assembly 635 (and mirrors 610 and 620) along orbiting arm 636. This results in a translation, ΔR, of the object beam across the surface of HMC 630.

Steering is achieved in a second axis of the polar coordinate system (R,φ) by orbiting arm 636. Orbiting arm 636 can be turned through a full 360° orbit by orbital control 640 and drive arm 645. As orbiting arm 636 is turned about the orbital axis, shown as a dotted line, through drive shaft 645, mirror 610 rotates in place at the orbital axis and mirror 620 orbits about mirror 610 and the orbital axis. The position of orbital arm 636 therefore determines the orbital angle, φ, of the object beam in the polar coordinate system (ΔR,φ).

In alternate embodiments of the present invention, the steering systems described above may be used for coarse control steering of the object beam across the holographic memory cell, while fine control scanning may be achieved by physically translating the SLM before imaging. It will be appreciated by those skilled in the art that translating the SLM by an amount R produces a translation of the output image by an amount $-R(f_2/f_1)$ in a 4-f imaging system, where $f_1$ is the focal length of the first lens the object beam encounters and $f_2$ is the focal length of the second lens the object beam encounters. It will also be appreciated by those skilled in the art that translating the SLM by an amount R produces a translation of the output image by an amount −R(d/s) in a single lens imaging system.

Image steering systems that translate the SLM are described in greater detail in U.S. patent application Ser. No. (Attorney Docket No. CAMPBELL 6-14-3), entitled "System and Method Using a Translating Reference Mask to Access Data Locations in a Holographic Memory" and filed concurrently herewith.

The one-dimensional (1D) and two-dimensional (2D) beam steering systems may be further improved by using a "mirror image" setup of lenses on the opposing side of the holographic memory cell. In this way, data may be steered onto two sides of the HMC simultaneously. As will be explained below in connection with FIG. 7, a "mirror image" optical setup on the opposing side of the HMC may also be used to retrieve data from the HMC, if the spatial light modulator is replaced with a two-dimensional array of light sensitive detectors.

Figure 7:
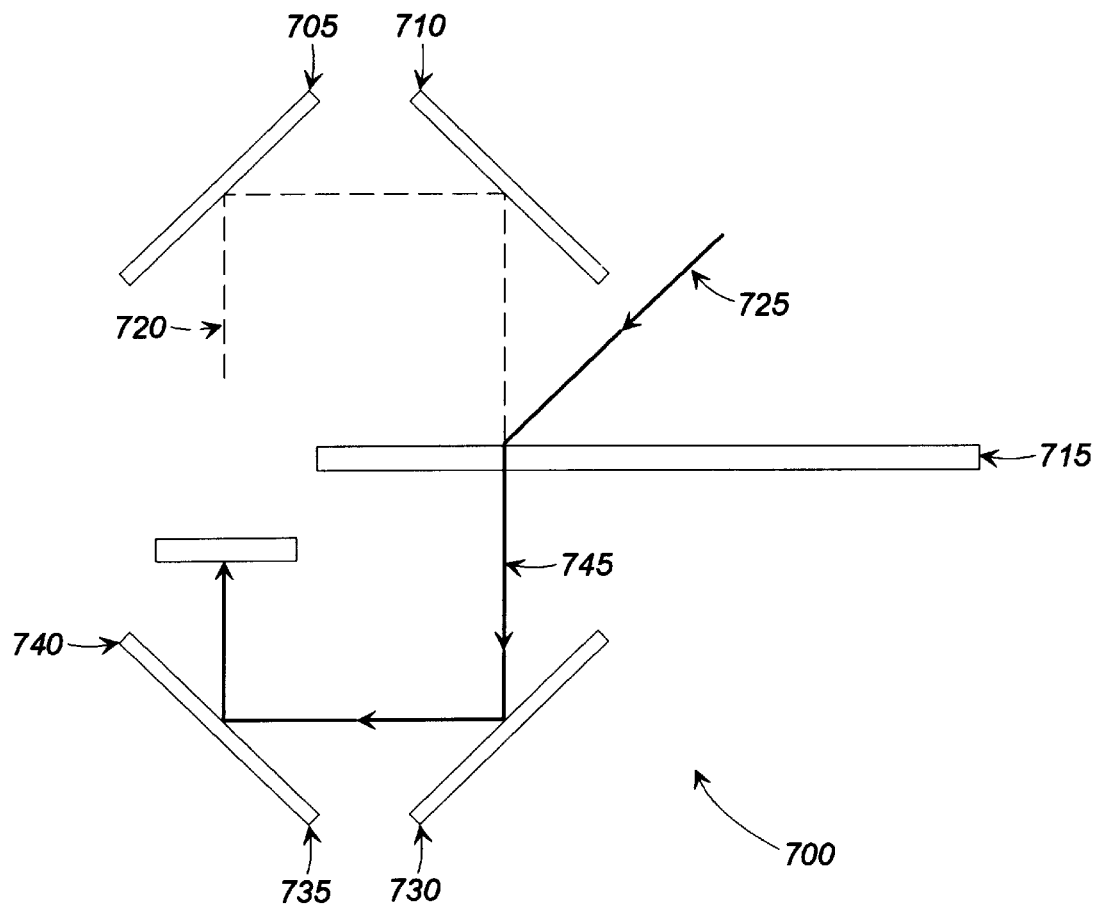
FIG. 7 illustrates a holographic memory system according to a fifth embodiment of the present invention.

FIG. 7 illustrates holographic memory system 700 according to a fifth embodiment of the present invention. Mirror 705 and mirror 710 comprise a Fresnel region beam steering system for steering object beam 720 (shown as a dotted line) onto orbiting holographic memory cell (HMC) 715. Mirrors 705 and 710 may comprise a pair of translating mirrors or a pair of rotating mirrors, similar to those shown in FIGS. 3 and 4. Object beam 720 may be received from either a 4-f imaging system or a single lens imaging system (not shown).

As previously described, reference beam 725 (shown as a solid line) and object beam 720 interact to produce a holographic image at a selected position. The position is determined by the orbital angle, ϕ, of HMC 715 and the relative positions of mirrors 705 and 710 if mirrors 705 and 710 are translating mirrors. Alternatively, the position of the holographic image is determined by the orbital angle, ϕ, of HMC 715 and the relative angles of mirrors 705 and 710 if mirrors 705 and 710 are rotating mirrors. The hologram is a function of the relative amplitudes of, and the phase differences between, object beam 720 and reference beam 725, and the angles at which object beam 720 and reference beam 725 are projected onto HMC 715.

Data is retrieved using mirror 730 and mirror 735, which comprise a "mirror image" of mirror 710 and mirror 705. Object beam 720 may be reconstructed by projecting reference beam 725 into HMC 715 at the same angle and position used to produce the hologram. The hologram and reference beam 725 interact to reproduce the reconstructed object beam 745 (shown as a solid line). Reconstructed object beam 745 is then projected onto light sensitive detector 740, which reads back the data by sensing the pattern of light and dark pixels.

Figure 8:
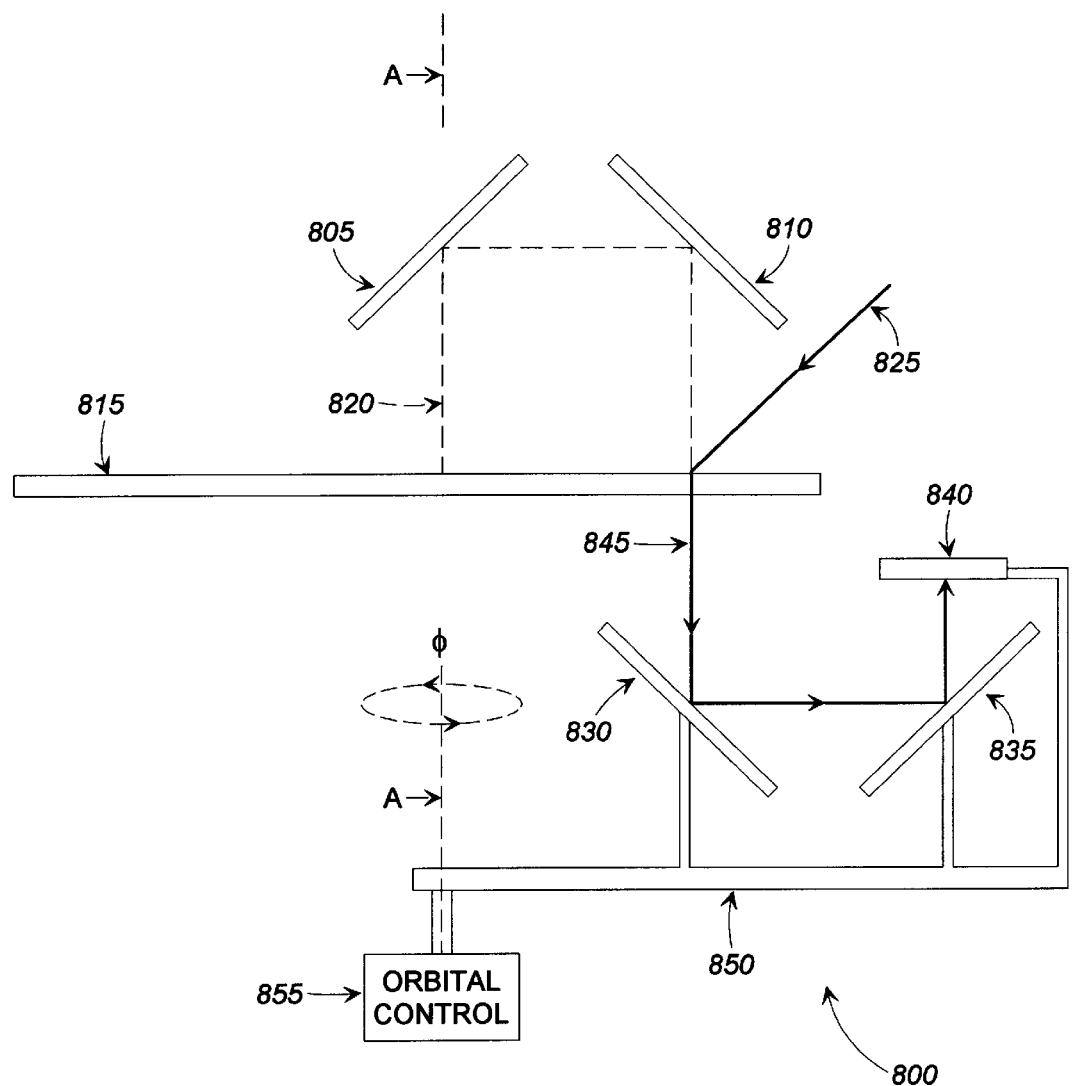
FIG. 8 illustrates a holographic memory system according to a sixth embodiment of the present invention.

FIG. 8 illustrates holographic memory system 800 according to a sixth embodiment of the present invention. Mirror 805 and mirror 810 comprise an orbiting Fresnel region beam steering system for steering object beam 820 (shown as a dotted line) onto fixed holographic memory cell (HMC) 815. Mirrors 805 and 810 may comprise a pair of translating mirrors or a pair of rotating mirrors, similar to those shown in FIGS. 5 and 6. For the purpose of simplicity, the orbital and rotational or translational controls for mirrors 805 and 810 are not shown in FIG. 8. Object beam 820 may be received from either a 4-f imaging system or a single lens imaging system (not shown).

As previously described, reference beam 825 (shown as a solid line) and object beam 820 interact to produce a holographic image at a selected position. The holographic image position is determined by the orbital angle, ϕ, and the relative positions of mirrors 805 and 810 if mirrors 805 and 810 are translating mirrors. Alternatively, the position of the holographic image is determined by the orbital angle, ϕ, and the relative angles of mirrors 805 and 810 if mirrors 805 and 810 are rotating mirrors. The hologram is a function of the relative amplitudes of, and the phase differences between, object beam 820 and reference beam 825, and the angles at which object beam 820 and reference beam 825 are projected onto HMC 815.

Data is retrieved using mirror 830 and mirror 835, which comprise a "mirror image" of mirror 810 and mirror 805. Mirrors 830 and 835 and light sensitive detector 840 are mounted on orbital arm 850 and the entire assembly is orbited by orbital control 855. Orbital axis A, shown as a dotted line, indicates the axis about which mirrors 805, 810, 830 and 835 are orbited. Object beam 820 may be reconstructed by projecting reference beam 825 into HMC 815 at the same angle and position used to produce the hologram. The hologram and reference beam 825 interact to reproduce the reconstructed object beam 845 (shown as a solid line). Reconstructed object beam 845 is then projected onto light sensitive detector 840, which reads back the data by sensing the pattern of light and dark pixels.

Although the above-described beam steering systems are used to steer an object beam to selected positions on a holographic memory cell, this is by way of illustration only and should not be construed to limit the scope of the present invention in any way. Those skilled in the art will appreciate that the beam steering systems disclosed herein may be readily adapted to steer a reference beam instead.

Although the present invention has been described in detail, those skilled in the art should understand that they can make various changes, substitutions and alterations herein without departing from the spirit and scope of the invention in its broadest form.

What is claimed is:

1. A system for steering a complex, spatially-modulated incident beam of light to gain access to data locations in a holographic memory cell (HMC), comprising:

first and second reflective elements locatable to receive and reflect said incident beam from an aperture in said HMC;

a reflective element steering mechanism, coupled to said first and second reflective elements, that moves said first and second reflective elements to steer said incident beam in a desired direction; and an HMC rotating mechanism, couplable to said HMC, that rotates said HMC about an axis thereof, said reflective element steering mechanism and said HMC rotating mechanism cooperating to cause said incident beam to illuminate a location on a plane of said HMC that is a function of a movement of said first and second reflective elements and a rotational position of said HMC.

2. The system as recited in claim 1 wherein said reflective element steering mechanism rotates said first and second reflective elements about first and second axes, respectively.

3. The system as recited in claim 1 wherein said reflective element steering mechanism translates said first and second reflective elements in tandem.

4. The system as recited in claim 1 further comprising an incident beam of coherent light having a space bandwidth product (SBP) of at least 100.

5. The system as recited in claim 1 wherein said reflective element is a mirror.

6. The system as recited in claim 1 wherein said HMC is substantially planar.

7. A method of steering a complex, spatially-modulated incident beam of light to gain access to data locations in a holographic memory cell (HMC), comprising the steps of:

reflecting said incident beam from an aperture in said HMC with first and second reflective elements;

moving said first and second reflective elements to steer said incident beam in a desired direction; and rotating said HMC about an axis thereof to cause said incident beam to illuminate a location on a plane of said HMC that is a function of a movement of said first and second reflective elements and a rotational position of said HMC.

8. The method as recited in claim 7 wherein said step of moving comprises the step of rotating said first and second reflective elements about first and second axes, respectively.

9. The method as recited in claim 7 wherein said step of moving comprises the step of translating said first and second reflective elements in tandem.

10. The method as recited in claim 7 further comprising the step of radiating an incident beam of coherent light having a space bandwidth product (SBP) of at least 100.

11. The method as recited in claim 7 wherein said reflective element is a mirror.

12. The method as recited in claim 7 wherein said HMC is substantially planar.

13. A system for storing data, comprising:

a light source;

a spatial light modulator located to modulate a complex, spatially-modulated beam of light received from said light source;

first and second reflective elements locatable to receive and reflect said beam from an aperture in said HMC;

a reflective element steering mechanism, coupled to said first and second reflective elements, that moves said first and second reflective elements to steer said beam in a desired direction;

a substantially planar holographic memory cell (HMC); and an HMC rotating mechanism, couplable to said HMC, that rotates said HMC about an axis thereof, said reflective element steering mechanism and said HMC rotating mechanism cooperating to cause said beam to illuminate a location on a plane of said HMC that is a function of a movement of said first and second reflective elements and a rotational position of said HMC.

14. The system as recited in claim 13 wherein said reflective element steering mechanism rotates said first and second reflective elements about first and second axes, respectively.

15. The system as recited in claim 13 wherein said reflective element steering mechanism translates said first and second reflective elements in tandem.

16. The system as recited in claim 13 further comprising an incident beam of coherent light having a space bandwidth product (SBP) of at least 100.

17. The system as recited in claim 13 wherein said reflective element is a mirror.

* * * * *